Oct. 17, 1939.    J. G. MORAN    2,176,268
SIGNAL
Filed Dec. 17, 1934    2 Sheets-Sheet 1
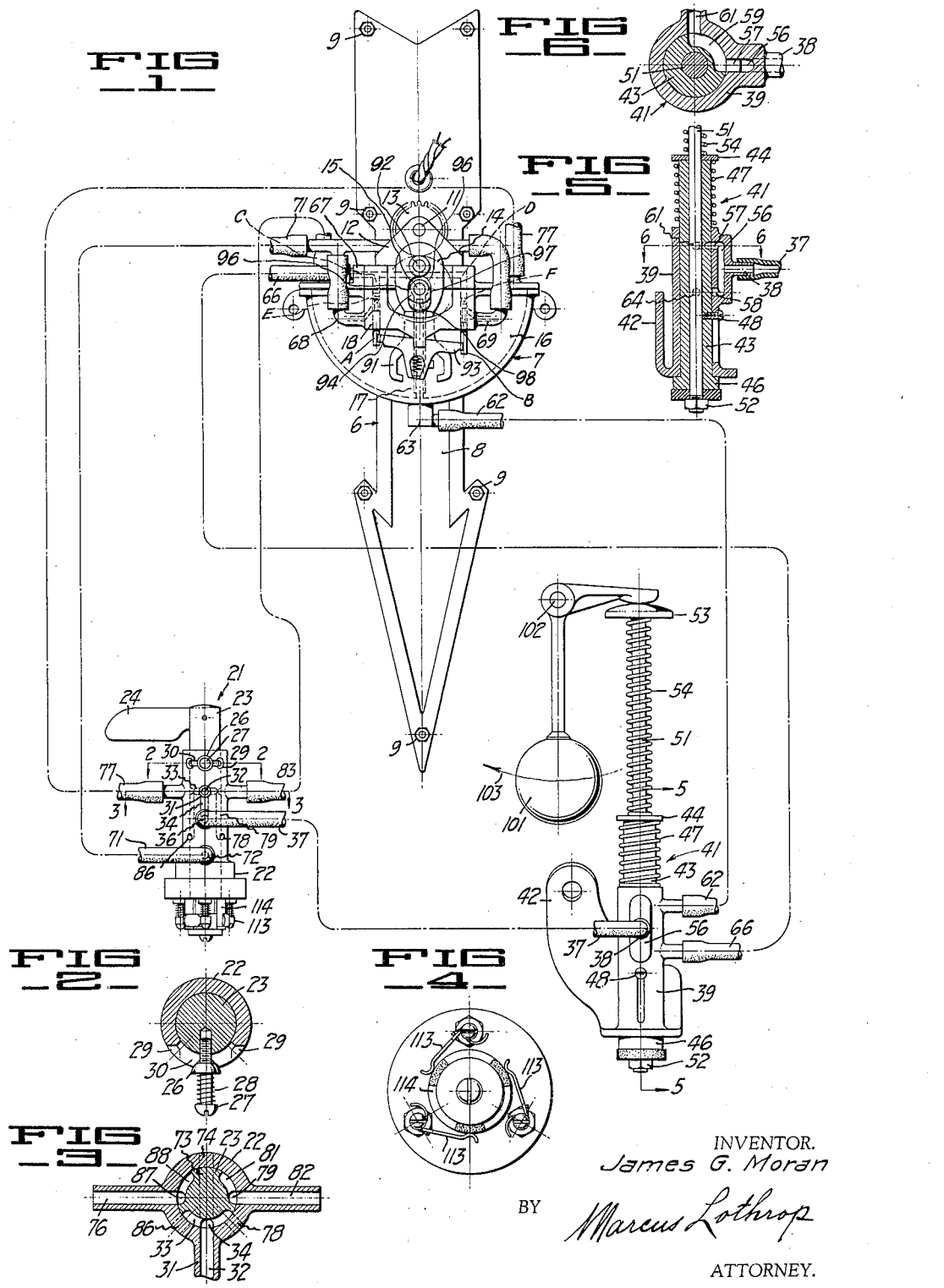
INVENTOR.
James G. Moran
BY
Marcus Lothrop
ATTORNEY.

Oct. 17, 1939.  J. G. MORAN  2,176,268
SIGNAL
Filed Dec. 17, 1934  2 Sheets-Sheet 2
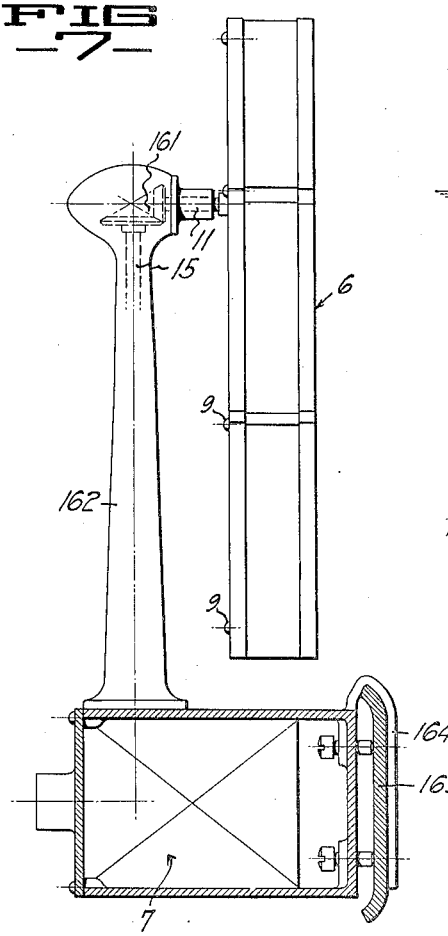
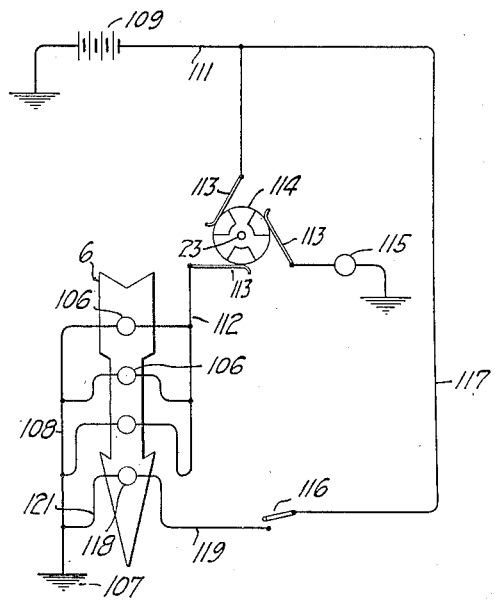
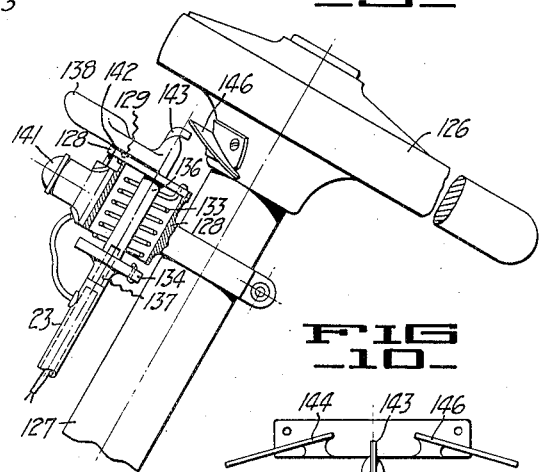
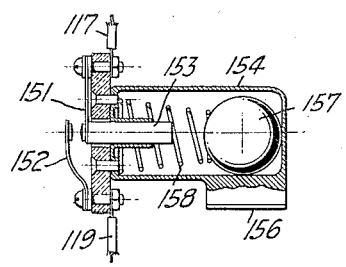
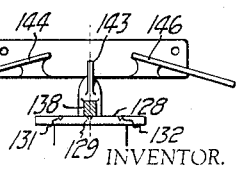
INVENTOR.
James G. Moran
BY Marcus Lothrop
ATTORNEY.

Patented Oct. 17, 1939

2,176,268

UNITED STATES PATENT OFFICE 2,176,268

SIGNAL

James G. Moran, Modesto, Calif.

Application December 17, 1934, Serial No. 757,872

6 Claims. (Cl. 116—39)

My invention relates to means for indicating to observers the intended course of a vehicle, and is especially concerned with means particularly useful on an automobile for mechanically indicating stop and turn signals.

An object of my invention is to provide a signal which will give left turn, right turn and stop indications.

Another object of my invention is to provide a signal having an attention-attracting moving part.

A further object of my invention is to utilize for the moving part a source of power which is available on virtually all automobiles.

An additional object is to provide a signal of sufficient simplicity to facilitate economical manufacture and reliable operation.

Other objects together with the foregoing are attained in the embodiment of my invention shown in the drawings in which Fig. 1 shows diagrammatically the arrangement and connection of several units included in my signal, each of the units being shown in elevation.

Fig. 2 is a cross-section the plane of which is indicated by the line 2—2 of Fig. 1.

Fig. 3 is a cross-section the plane of which is indicated by the line 3—3 of Fig. 1.

Fig. 4 is a bottom view of the manual control unit.

Fig. 5 is a cross-section the plane of which is indicated by the line 5—5 of Fig. 1.

Fig. 6 is a cross-section the plane of which is indicated by the line 6—6 of Fig. 5.

Fig. 7 is a side elevation, parts being in cross-section, of a modified form of the indicating unit of my signal installed upon a vehicle.

Fig. 8 is an electric circuit diagram for my signal.

Fig. 9 is a side elevation of an automatic restoring mechanism, parts being in section.

Fig. 10 is a plan of the mechanism of Fig. 9.

Fig. 11 is a cross-section of an automatic circuit closer.

In its preferred form, the signal of my invention includes a movable indicating member which is moved selectively to either of two extreme positions or oscillates between them, being impelled by a vacuum-operated motor under control of suitable mannually and/or automatically operated valves. Usually, electric lights are incorporated in the signal and are suitable controlled therewith.

As shown particularly in Fig. 1, my signal includes an arrow-like indicator 6 or vane and an actuator 7 therefor which is adapted to be suitably mounted upon a vehicle so that the indicator 6 is readily visible and prominently displayed. The indicator itself can be of various different forms but conveniently is a hollow metal box of appropriate outline and preferably incorporates translucent or transparent panels 8 for transmission of interior illumination. The indicator parts are separable for ready access to the interior and are normally held together by fastenings 9.

Approximately at its center of gravity, or preferably slightly thereabove, so that the indicator will hang vertically downward when at rest, the indicator is fastened to a shaft 11 journaled in a bracket 12 forming part of the actuator structure. The indicator is thus mounted for swinging movement with respect to its mounting and about a generally horizontal axis. The shaft 11 carries a gear 13 meshing with a gear 14 fastened on the main actuator shaft 15. The ratio of the gears 13 and 14 is such as to afford the desired range of indicator movement.

The actuator proper is preferably exactly similar in its fundamentals to one of the standard vacuum motors now on the market and usually used in connection with windshield wipers. This structure, being well known, is not described in detail but is characterized by a semi-cylindrical chamber 16 within which a flat, radial piston 17 operates to and fro being controlled by appropriate valves A and B in a valve chest 18. The piston 17 is fast on the shaft 15, so that when the actuator is connected to a source of vacuum the piston is oscillated, the gears 13 and 14 rotate and the indicator 6 swings.

To control the operation of the indicator, there is preferably provided a manually-operated control unit, generally designated 21, which is mounted in a convenient location for operation by the vehicle driver. The control unit comprises a stationary cylindrical casing 22 within which a cylindrical plug 23 is rotatable. A handle 24 is provided for manipulating the plug, while the plug is releasably held in any of three selected positions by a retainer 26 slidable on a stud 27 projecting radially from the plug 23 and urged by a spring 28 to seat in any of three depressions 29 formed by enlargements of a circumferential slot 30 in the casing 22 within which the stud 27 moves.

The central position of the handle 24, and consequently of the plug 23, is neutral while the right-hand position is for a right-hand signal and the left-hand position is for a left-hand signal. Various ports and passages in the plug 23 and the casing 22 are interconnected to produce the desired results.

Vacuum from any suitable source, such as the vehicle intake manifold, is made available through a connection 31 leading to a port 32 in the casing, which is always in communication with a circumferential groove 33 in the plug. There is an axial groove 34 in the plug which merges with the groove 33 and opens to a port 36 in the casing. This latter port is connected by a tube 37 to a nipple 38 on the cylindrically bored housing 39 of a pedal valve 41. This valve 41 is adapted to be connected to or contacted by the brake linkage of the vehicle for affording a "stop" actuation of the indicator.

The housing 39 is provided with a mounting bracket 42 and receives a slidable piston 43 extending therethrough but limited in axial movement by enlargements 44 and 46. A spring 47 surrounding the piston and interposed between the housing and the enlargement 44 yieldingly holds the piston in one extreme position. Rotation of the piston in the housing is precluded by a radial pin 48 projecting from the piston through an axial slot in the housing. The piston 43 is itself axially bored to receive a spindle 51 passing entirely therethrough and limited in movement by a nut 52 on one end and an enlarged head 53 on the other end for contact with the brake linkage. A spring 54, stronger than the spring 47, is disposed between the enlargement 44 and the head 53. By this mechanism, the initial movement of the spindle 51 is effective to displace the piston 43, but excessive movement of the spindle has no further effect to move the piston.

In the position of the mechanism shown in Figs. 1 and 5, the nipple 38 opens into a branched passage 56 having a pair of ports 57 and 58. The port 57 communicates with a quadrant passage 59 in the piston 43 leading to a port 61 in the housing 39. A tube 62 connects the port 61 to a port 63 in the casing of the actuator located at the neutral or central position of the piston 17. Ordinarily, therefore, the piston is held positively in central location, despite minor jars and dislodging forces by vacuum exerted on the end or bottom face of the piston augmented by equalized pressures on opposite sides of the piston. Whenever the spindle 51 is depressed and the piston 43 is displaced, communication between the port 57 and the port 61 is interrupted. The quadrant passage 59 moves to establish communication between the port 58 and a port 64 in the housing 39 which latter is connected by a tube 66 with the standard vacuum connection 67 of the actuator. The piston valves A and B have reduced central portions and operate in bores C and D which communicate through openings E and F with the chamber 16 on opposite sides of the piston 17.

The atmospheric air which must pass through the actuator as a driving fluid enters the valve chest 18 through branches 68 and 69 which open respectively into the bores C and D. When the valves A and B are alternately translated in their bores they alternately subject the chamber 16 on opposite sides of the piston to atmospheric and subatmospheric pressure, so that a continuous oscillation of the indicator is produced.

From the branches 68 and 69, a conduit 71 leads to a port 72 in the casing 22 which in turn opens to the atmosphere through a diametral passage 73 in the plug 23 leading to a port 74 in the casing 22.

In order that the indicator can be swung to either selected extreme position to indicate either a left-hand turn or a right-hand turn, and so that such indication will take precedence over or will supersede oscillatory movement of the indicator during brake application, the plug 23, when turned to the "left" position, for instance, first interrupts communication through the port 72 by moving the passage 73 out of registry therewith and simultaneously interrupts communication through the port 36 by moving the groove 34 away therefrom. The groove 33 is displaced into communication with a port 76 connected through a tube 77 to the actuator chamber on one side of the piston 17, while at the same time atmospheric air is admitted to the casing 22 through a port 78 then registering with an axial passage 79 in the plug opening into a circumferential passage 81 registering with a port 82. This is connected by a tube 83 to the actuator chamber on the opposite side of the piston 17, so that when the plug 23 is moved as described the indicator is correspondingly moved by vacuum to the appropriate extreme indicating position. This is customarily a position in which the indicator is approximately horizontal, with the arrow pointing to the direction of intended turn.

Correspondingly, if the plug 23 is turned to the "right" position, the circumferential groove 33 establishes communication between the port 82 and the port 32, so that through the tube 83 the appropriate side of the actuator chamber is evacuated. At the same time, air enters through a port 86 in the casing 22 and passes through an axial groove 87 in the plug 23, and flows through a circumferential groove 88 and thence through the port 76 and the tube 77 to the other side of the actuator chamber. A movement of the indicator to represent a right-hand turn is thus effected when the handle 24 is suitably operated.

Ordinarily the indicator is horizontal when in an extreme position, which means that it must swing through 180 degrees when passing from one extreme position to the other. While the arrow can also oscillate rapidly between these extreme positions for a "stop" indication, I prefer that the "stop" oscillations be somewhat less in amplitude. So that such a mode of operation will be feasible, I have provided a valve-actuating yoke 91 mounted to pivot on a pin 92 and adapted to engage the valve-actuating rocker 93. The yoke 91 is driven by a cam 94 having a pair of symmetrical actuating faces 96 and 97 and a concentric surface 98. The cam is mounted on the shaft 15 and because of its configuration is effective to operate the yoke 91 to manipulate the valves A and B with a predetermined amount of angular rotation, but is ineffective to produce any overthrow of the valves despite further regular rotation of the shaft 15.

In place of actuating the stop signal by movement of the foot brake pedal, or in addition thereto, I preferably provide means for causing actuation of the "stop" signal upon a rapid deceleration (negative acceleration) of the vehicle. As diagrammatically shown in Fig. 1, I mount a pendulum 101 on any appropriate part of the vehicle by means of a bracket 102 so that the pendulum can swing about a horizontal transverse axis. Since the arrow 103 shows the forward direction of vehicle travel, it will be clear that when the vehicle, after travelling at some speed decelerates relatively rapidly, the pendulum will swing in the direction of the arrow 103 and will actuate the mechanism to produce a "stop" indication which will be discontinued when the vehicle comes to rest or when the deceleration does not exceed a predetermined amount.

Electric illumination can be employed to increase the visibility and attention value of my signal, and I preferably provide the indicator with a plurality of light globes 106 which are connected to ground 107 by leads 108, and which receive electricity from a battery 109 through leads 111 and 112. Each of these latter leads terminates in a brush 113 bearing on a switch commutator 114 so that when the handle 24 is in neutral position the circuit is open, but when the handle 24 is turned either to the right or to the left the circuit is closed and the globes 106 are illuminated. A brush 113 is connected to ground through a globe 115 which is simultaneously illuminated with the globes 106 but is so located as to be readily visible to the driver as an indicator light. Additionally, a switch 116 is connected to the battery 109 by a lead 117 and to a globe 118 by a wire 119. This globe is situated in the point of the indicator arrow and is grounded by a conductor 121. The controlling switch 116 is arranged to be actuated coincidentally with the operation of the spindle 51 to place the globe 118 in circuit for illumination.

While I prefer that there be a manual initiation of the operation of the actuator, and while manual termination of such operation is satisfactory, it is also desirable to provide for mechanical or automatic signal termination. As shown in Fig. 9, the plug 23 is extended by a shaft to a convenient location adjacent the steering wheel 126 of the vehicle. This wheel 126 is rotatable with respect to a steering column 127, in the usual fashion. Clamped on the steering column 127 is a plate 128 having a central notch 129 and two side notches 131 and 132, respectively. The plate is pierced to receive one end of a coil spring 133 the other end of which engages a disc 134 fastened to a sleeve 136 rotatable in the plate 128. The sleeve is likewise axially slidable in the plate and also along the shaft by means of a squared connection 137. A handle 138 is fastened to the sleeve and extends to a convenient point of operation.

The expansive force of the spring 133 tends to hold the handle 138 against the plate and with its lower face normally seated in the central notch 129. When the handle is rotated in either direction it compresses the spring 133 in an axial direction until it seats in either of the notches 131 and 132 and simultaneously either winds or unwinds the spring 133. This movement of the handle serves to control the actuator completely for either a right-hand turn indication or a left-hand turn indication. The position of the handle 138 can be emphasized when it departs from neutral position, by a pilot light 141 mounted on the plate 128 and connected in the electrical circuit of the signal by a switch 142.

To restore the handle 138 to neutral position after it has been set to operate the indicator, and after the indicated vehicle maneuver has been accomplished, I provide a notched hook 143 on the sleeve 136 which is passed over by one of a pair of resilient wings 144 and 146 whenever the steering wheel 126 is turned more than a minimum amount represented by the clear space between the wings. The wings are preferably integral with a plate fastened to the steering wheel 126. When the wheel 126 is returned to straight-ahead position, after a turn has been executed, the notched hook 143 is engaged by the appropriate one of the wings 144 and 146 and is lifted axially. This lifts the handle 138 from its particular one of the restraining notches 131 and 132, so that it is restored to neutral position by the spring 133.

The switch 116 which actuates the stop-light globe 118 can be made responsive to an abrupt deceleration of the vehicle, as shown in Fig. 11. In this case, the leads 117 and 119 are connected to a movable contact arm 151 and a fixed contact arm 152. A plunger 153 is mounted for translation in an enclosing shell 154 having a bracket 156 for mounting the shell generally horizontally and with its axis running fore and aft of the vehicle. The shell is arranged with the plunger 153 at its forward end. Within the shell is a relatively heavy weight in the form of a ball 157, normally held in one extreme position by a spring 158. When the deceleration of the vehicle exceeds a predetermined amount, fixed by the spring 158, the ball 157 moves forward against the urgency of the spring 158 to close the circuit to the light 118 by moving the contact arm 151 into abutment with the contact arm 152.

As especially shown in Fig. 7, the indicator 6 and the actuator 7 can be somewhat spaced apart and connected for operation through gearing 161. A suitable housing 162 provides an enclosure and a support and is designed for attachment, for instance, to the vehicle bumper 163 by a clamp 164. With this arrangement, but a single indicator suffices for a vehicle, being sufficiently visible both fore and aft.

I claim:

1. A signal comprising an indicating vane, a driving motor adapted to oscillate between two extreme positions connected to said vane, means for energizing said motor to oscillate said vane repeatedly between said extreme positions, means for energizing said motor to impel said vane selectively to either one of said extreme positions, and means for energizing said motor to maintain said vane in a selected position between said extreme positions.

2. A signal comprising a pivotally mounted indicating vane, a device including means for repeatedly oscillating said vane between two extreme positions, said device including additional means for rotating said vane into and maintaining said vane in either one of said extreme positions, and pneumatically operated means forming a part of said device for maintaining said vane in a selected position between said extreme positions.

3. A signal comprising a pivotally mounted indicating vane, an arcuate cylinder, a piston adapted to oscillate in said cylinder, means connecting said piston to oscillate said vane, means for equalizing the pressure in said cylinder on opposite sides of said piston, means for unbalancing the pressure in said cylinder on opposite sides of said piston, and means controlled by said piston for alternately subjecting opposite sides of said piston to the higher pressure when said pressure is unbalanced on opposite sides of said piston, to automatically effect repeated oscillation of said vane.

4. A signal for a vehicle comprising an oscillatable indicating vane, a device including means for repeatedly oscillating said indicating vane between two extreme positions, said device including additional means for holding said indicating vane in either of said extreme positions, and pneumatic means forming a part of said device and alternatively operable with said additional means for holding said indicating vane in a neutral position between said extreme positions.

5. A signal for a vehicle comprising a movable indicating vane, a device including means for holding said vane at will in either of two extreme positions, said device including pneumatically operated means for holding said vane in a neutral position between said extreme positions, and additional means forming a part of said device for alternatively moving said vane repeatedly to and fro between said positions.

6. A signal comprising an oscillatable indicating vane, a pneumatically operated motor connected to said vane, means for energizing said motor to oscillate said vane repeatedly between two extreme positions, means for energizing said motor to impel said vane selectively to either one of said extreme positions and means for energizing said motor to maintain said vane in a selected position between said extreme positions.

JAMES G. MORAN.